United States Patent
Sprague

(12) United States Patent (10) Patent No.: US 7,375,634 B2
Sprague (45) Date of Patent: May 20, 2008

(54) DIRECTION SIGNAGE SYSTEM

(75) Inventor: Robert A. Sprague, Saratoga, CA (US)

(73) Assignee: Xerox Corporation, Norwalk, CT (US)

( * ) Notice: Subject to any disclaimer, the term of this patent is extended or adjusted under 35 U.S.C. 154(b) by 186 days.

(21) Appl. No.: 11/198,183

(22) Filed: Aug. 8, 2005

(65) Prior Publication Data

US 2007/0030152 A1 Feb. 8, 2007

(51) Int. Cl.
*G08B 13/14* (2006.01)

(52) U.S. Cl. .................... 340/572.1; 701/209; 701/211

(58) Field of Classification Search ............ 340/572.1, 340/932.2, 935
See application file for complete search history.

(56) References Cited

U.S. PATENT DOCUMENTS

| | | | |
|---|---|---|---|
| 4,126,854 A | 11/1978 | Sheridon | |
| 4,143,103 A | 3/1979 | Sheridon | |
| 5,920,287 A * | 7/1999 | Belcher et al. ............. | 342/450 |
| 6,049,745 A | 4/2000 | Douglas et al. | |
| 6,127,945 A * | 10/2000 | Mura-Smith ................ | 340/988 |
| 6,418,372 B1 * | 7/2002 | Hofmann .................... | 701/209 |
| 6,456,239 B1 * | 9/2002 | Werb et al. ................. | 342/463 |
| 6,587,755 B1 * | 7/2003 | Smith et al. ................... | 701/1 |
| 6,622,088 B2 * | 9/2003 | Hood ......................... | 701/211 |
| 6,661,335 B1 | 12/2003 | Seal | |
| 6,738,712 B1 * | 5/2004 | Hildebrant ................... | 701/213 |
| 6,774,782 B2 | 8/2004 | Runyon et al. | |
| 6,922,138 B2 * | 7/2005 | Melvin ........................ | 340/438 |
| 6,924,741 B2 * | 8/2005 | Tamayama et al. ...... | 340/572.1 |
| 7,035,650 B1 * | 4/2006 | Moskowitz et al. ...... | 455/456.5 |
| 7,044,373 B1 * | 5/2006 | Garber et al. ................ | 235/385 |
| 7,113,088 B2 * | 9/2006 | Frick et al. ............ | 340/539.11 |
| 7,209,807 B2 * | 4/2007 | Smith et al. .................... | 701/1 |
| 2002/0008621 A1 * | 1/2002 | Barritz et al. ............ | 340/572.1 |
| 2002/0126010 A1 * | 9/2002 | Trimble et al. .......... | 340/568.1 |
| 2002/0180588 A1 * | 12/2002 | Erickson et al. ........... | 340/10.2 |
| 2005/0060088 A1 * | 3/2005 | Helal et al. ................ | 701/208 |
| 2005/0206523 A1 * | 9/2005 | Engellenner ............. | 340/572.1 |
| 2006/0029250 A1 * | 2/2006 | Karaki ....................... | 382/100 |
| 2006/0145865 A1 * | 7/2006 | Forster .................... | 340/572.8 |
| 2006/0176239 A1 * | 8/2006 | Sweeney ..................... | 345/1.2 |
| 2006/0265664 A1 * | 11/2006 | Simons et al. .............. | 715/772 |
| 2006/0271274 A1 * | 11/2006 | Saarikivi ..................... | 701/200 |
| 2006/0292984 A1 * | 12/2006 | Teate et al. ................. | 455/41.2 |
| 2007/0024463 A1 * | 2/2007 | Hall et al. ............. | 340/825.69 |

OTHER PUBLICATIONS

Encarta World English Dictionary, http://encarta.msn.com/encnet/features/dictionary/DictionaryResults.aspx?refid=1861684260.*

* cited by examiner

*Primary Examiner*—Davetta W. Goins
*Assistant Examiner*—Kerri McNally
(74) *Attorney, Agent, or Firm*—Pillsbury Winthrop Shaw Pittman LLP

(57) ABSTRACT

An electronic signage for directing persons to desired locations.

25 Claims, 4 Drawing Sheets

DIRECTION SIGNAGE SYSTEM

BACKGROUND

Disclosed is a method and system for directing a person to a desired location. In a more specific embodiment, there is disclosed an electronic system operationally configured to visually direct person(s) along a path to a desired location. In a further embodiment, the electronic signage is used to personally direct a person to a location desired by the person in a distributed building or campus.

A person may face difficulty in navigating a complex establishment, in particular when the layout of the establishment is not familiar. Persons daily face difficulty in finding many locations, such as a particular room for surgery in a hospital, a particular office in an office building, a unique facility on a college campus, and the location of items sought for purchase. A person seeking a location in, or item stored in, a particular establishment may opt to navigate by way of directional signs placed at strategic locations in the establishment. A person seeking a location alternatively may seek verbal instructions in respect of navigation by requesting direct help from, for example, a person stationed at the front desk of the establishment. In some cases, a person seeking directions may be given a map of the establishment which may be used as a navigational tool to reach a desired location.

Electronically-facilitated directional systems that guide travel are known.

One electronically-facilitated directional system employed in factories and institutions is the automated mail and item delivery system. Such automated directional mail and delivery systems may be based on wire guidance systems with bar coding, radio frequency identification (RFID) tags, or other identification sources being used to indicate various destinations. Such systems may employ vehicle intelligence along with a central or host computer.

Bar codes are codes by means of which information (e.g. a sequence of digits) can be presented in an optically-machine-readable form, each of a plurality of basic elements which are available to constitute the information in code being represented by a uniquely arranged group of marks, or spaces between marks, the marks frequently arranged in the general form of bars. RFID tags are tags which are enable to receive and respond, actively or passively, to radio-frequency queries from a transceiver. RFID tags can be either active or passive. Passive RFID tags lack their own power supply and obtain power for responding to an incoming radio-frequency scan from the minute electrical current induced in the tag, for example, in the antenna. Active RFID tags, on the other hand, have a power source that permits responding to an incoming radio-frequency scan, and may have longer ranges and larger memories than passive tags, as well as the ability to store additional information sent by the transceiver. RFID tags permit a tagged item to be read at a distance. Back scatter RFID tags permit range to be determined from a RFID reader positioned at a known location.

GPS directional systems are also known which guide a person from one location to another location. GPS is a world-wide radio navigation system, presently formed by a group of 24 satellites and their associated ground stations. GPS uses these satellites, referred to as NAVSTAR (Navigation Satellite Timing and Ranging), to calculate ground positions. The basis of GPS operation is the use of triangulation from the satellites. To triangulate, a GPS receiver measures distance using the travel time of radio signals. However, to measure travel time, GPS needs very accurate timing, plus it needs to know exactly where the satellites are in space. To solve this problem, each of the 24 satellites is inserted into a high enough orbit (12,000 miles) to preclude interference from other objects, both man-made and natural, and to insure overlapping coverage on the ground so that a GPS receiver can always receive from at least four of them at any given time.

REFERENCES

U.S. Pat. No. 6,049,745 describes a method and system for navigating automatic guided vehicles through a workplace having intelligible areas. A guidance apparatus conveys a plurality of guidance signals, and a plurality of radio frequency tags (RF tags) are provided along the path over which it travels. A controller is responsive to at least one of the plurality of guidance signals and at least one characteristic area condition identified by a RF tag reader.

U.S. Pat. No. 6,661,335 B1 discloses a system and method for determining the position of a radio frequency identification (RFID) transponder with respect to a sensor. The RFID transponder receives through an antenna a plurality of signals generated by a plurality of antenna coils arranged in physical orientations and configured to transmit radio frequency signals of differing phase. The RFID transponder compares the phase of at least two of the signals to determine the relative position of the transponder.

U.S. Pat. No. 6,774,782 discloses a system for reducing security risks wherein each security sensitive item which may contain security sensitive information has an RFID tag attached thereto, and the area in which they are stored is periodically interrogated by an RF interrogator to ascertain whether the items are in their locked secured position or are in an open area.

The disclosures of each of these patents is herein incorporated by reference in their entirety.

SUMMARY

Aspects disclosed herein include a system for directing a person to a location comprising an electronically-readable tag, an electronic interrogator operatively configured to detect the electronically-readable tag, electronic signage operatively coupled to the electronic interrogator, the electronic signage comprising a display and being operatively configured to alter a directional indication upon said display in response to the location of the tag in respect of the location of the electronic signage;

a visual directional electronic system comprising an object marker associated with an object, the object marker being operatively configured to store information indicative of the identity of the object; a plurality of location markers each positioned at one of a plurality of locations and operatively configured to store information associable with the location of the location marker; electronic signage comprising a display operatively configured to visually display directional information; an interrogator having detection circuitry capable of detecting location markers; a processor operatively connected to the interrogator and the electronic signage, the processor being operatively configured to receive input from as to the identity of an object from the object marker, and to receive input in respect of one or more items and to determine a spatial relationship between at least one location marker and the object, and to cause change in directional information displayed on the display of the electronic signage based on such spatial relationship;

an electronic directional system capable of locating one or more items of a plurality of items stored in a facility, the system comprising an object marker associated with an object, the object maker being operatively configured to store information indicative of the identity of the object; a plurality of location markers each positioned at one of a plurality of locations and operatively configured to store information associable with the location of the location marker; electronic signage comprising a display operatively configured to display directional information; an interrogator having detection circuitry capable of detecting location markers; an input operatively configured to obtain information pertaining to one or more items in the facility which are desired to be obtained from the facility; a processor operatively connected to the interrogator, the electronic signage, and the input, the processor being operatively configured to receive input as to the identity of an object from the object marker, to determine a spatial relationship between at least one location marker and the object, and to cause change in directional information displayed on the display of the electronic signage based on such spatial relationship and the input information; and a system for navigating to a desired location comprising a controller having an information processor and a communication transceiver; a plurality of routing tags providing information associable with the location of said routing tags to the processor upon receipt of a transmission from the communication transceiver; electronic signage comprising a display operatively configured to display directional information and operatively connected to the information processor; wherein said information processor is operatively configured to use information pertaining to routing tags responsive to a transmission from the communication transceiver and information pertaining to the desired location to determine the appropriate directional information to be displayed on the display of the electronic signage to permit navigation to the desired location.

DETAILED DESCRIPTION

Figure 1:
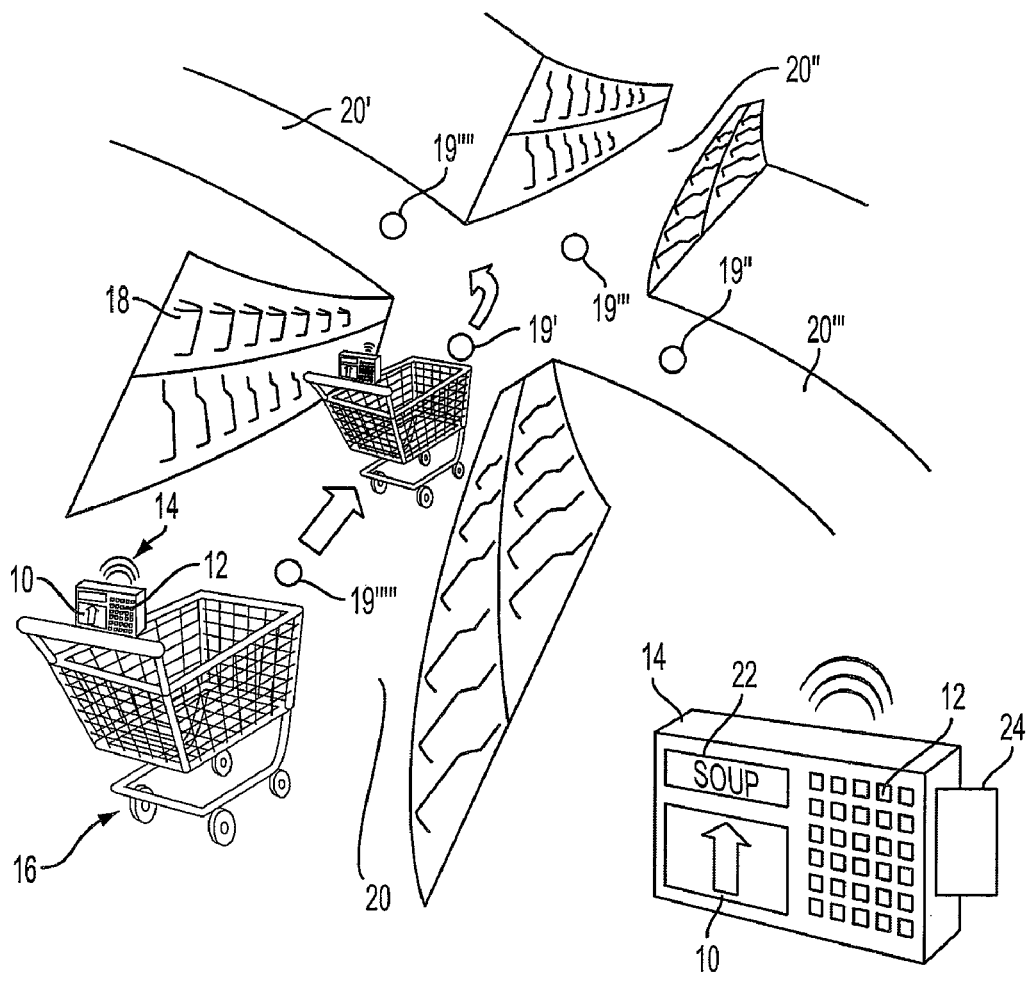
FIG. 1 generally illustrates an exemplary embodiment of a directional finding system with a mobile visual display.

In embodiments there is illustrated:

a system for directing a person to a location comprising an electronically-readable tag, an electronic interrogator operatively configured to detect the electronically-readable tag, electronic signage operatively coupled to the electronic interrogator, the electronic signage comprising a display and being operatively configured to alter a directional indication upon said display in response to the location of the tag in respect of the location of the electronic signage;

In one embodiment, there is provided a system of signs distributed throughout an enterprise, which display unique messages directing a visitor where to go at select positions throughout the enterprise. For example, a person who is trying to locate the magnetic resonance imaging (MRI) facility in a hospital may approach a sign, and the sing may switch to a message that states "Person X turn right here," or "MRI facility (with an arrow to the right)", or simply display a arrow pointing towards the MRI facility. As the person proceeds as directed, another sign ahead of the person may change and direct the person down the correct path. In such embodiment, signs may be mounted in numerous locations such as on the wall, hanging from the ceiling, or embedded in floor tiles. Direction may be given by a host of methods, including without limitation, arrows pointing in the correct direction, by moving colors, flashes, etc.

In an embodiment, there is a set of electronic signs distributed throughout a facility or campus. An electronic device is carried or transported by a visitor which communicates wirelessly with the signs, with the wireless communication providing the identity of the visitor, for example by a unique identity number associated with the electronic device or by transmission of actual person identity information, and/or information pertaining to the location which the individual wished to navigate toward. Software and system configurations are operatively configured to determine from such identity information and/or location information the direction toward the intended location of the visitor. The intended location may be statically associated with the electronic device, or may be dynamically associated with the electronic device, that is capable of being inputted into the device before giving the same to the visitor (or inputted by the visitor). The intended location may also be inputted into a processor operatively coupled to the electronic signs in association with the unique identity number, the software and system configurations using the unique identity number transmitted by the device to associate desired location and determine the direction in which the visitor should proceed.

In one embodiment, there may be made use of a widely distributed set of signs, which may be powered or battery driven, which each contain an RFID (Radio Frequency Identification) interrogator. On visiting, a visitor is provided a RFID tag, which may employ a static or dynamic RFID, which has an RFID locator linked to the desired destination of the visitor. The interrogator in each sign may continually or transiently transmit interrogation signals, When a visitor approaches within the range of the sign, the interrogator may detect the RFID tag and the sign may display a message sending the visitor in the right direction. Once the visitor has passed, and the RFID tag is no longer detected, the directional indicia may disappear from the sign. The sign may have room to display a number of messages directed at multiple visitors, as multiple visitors may walk within range of the interrogation signals at the same time. Such tags may seem unobtrusive and may even be attached to paperwork given to a visitor. The system architecture may have one or more, or all, signs in the facility in listening mode.

In yet another embodiment the visitor is given an active transmitter which sends out a signal that has a limited range of reception, such as a Bluetooth protocol link or simply a transmitter having limited power. When the visitor comes close enough for a communication link with the sign, the sign may recognize the sender, probe a host computer (for example, by a wireless network) for the location to which the visitor is being sent and a path plotted based on the sign to which the visitor is closest and the ultimate destination. The path plotted may be, for example, the quickest path, the easiest path, a safer path, a path taking the person by other locations desired by the person or the facility to be visited, or a path wherein electronic signs are known to exist and where direction pointing may be easiest. When the signs are in listening mode, the cost and power consumption of the signs may be low.

In another embodiment, the system employs electronically-detectable tags placed at locations along the routes available for travel. The device provided to the visitor, customer etc., may detect such tags and use the same to determine location of the person. In such case, the device itself may comprise the display and the navigation directions may be transmitted to the device carried by the visitor etc. for personal review.

In another embodiment, there is disclosed a visual directional electronic system comprising an object marker associated with an object, the object marker being operatively configured to store information indicative of the identity of the object; a plurality of location markers each positioned at one of a plurality of locations and operatively configured to store information associable with the location of the location marker; electronic signage comprising a display operatively configured to visually display directional information; an interrogator having detection circuitry capable of detecting location markers; a processor operatively connected to the interrogator and the electronic signage, the processor being operatively configured to receive input from as to the identity of an object from the object marker, and to receive input in respect of one or more items and to determine a spatial relationship between at least one location marker and the object, and to cause change in directional information displayed on the display of the electronic signage based on such spatial relationship; the object associated with the object marker can be any object, including, for example, a tag, a shopping cart, a hand held device, etc.

The system may seek one or more destinations desired by a person and lead the person to each destination. For example, a person may wish to locate several items in a facility. The system may provide for input pertaining to the items being sought by a person employing the navigational system. The system may lead one to each item irrespective of the other items being sought, or may take into account such other items to calculate a path that minimizes or reduces retracing of a path (in order to reduce time spent in collecting the items).

The system may lead a visitor from the entry destination to a final desired destination, or may simply point the visitor in the appropriate direction.

The electronic signage employed may comprise any of the display known in the art, including emissive displays, such as CRT, plasma, light emitting diode ("LED"), and backlit LCD, and non-emissive displays such as electrophoretic displays that display based on rapid migration of microparticles in colloidal suspensions or displays employing electrostatically polarized multichromal, for example bichromal, particles wherein the colorants are field translated or rotated so the desired hemisphere color faces the observer at each pixel (see, for example, U.S. Pat. No. 4,126,854 to Sheridon which describes a bichromal sphere having colored hemispheres of differing Zeta potential that allow the spheres to rotate in a dielectric fluid under influence of an addressable electrical field, and U.S. Pat. No. 4,143,103 to Sheridon which describes a display system using bichromal spheres in a transparent polymeric material). Selection of the appropriate display may take into account numerous factors including cost and battery power, as well as the pixel switching time needed to display messages.

Now turning to the figures.

In FIG. 1, there illustrated an exemplary embodiment of a directional finding system employing a mobile visual directional display 10. Mobile visual directional display 10 is housed in a controller 14 attached to cart 16. Controller 14 allows input of information pertaining to the location desired by a person, such as the location where items 18 are stored, as shown in display 22, by way of touch components 12 or electronic input 24. Controller 14 is operationally configured to detect one or more location tags 19', 19", 19'", 19"" positioned in the navigational pathways available, such as isles 20', 20", 20'", 20"", so that the controller can detect the position of the cart and calculate a path to the item desired.

Figure 2:
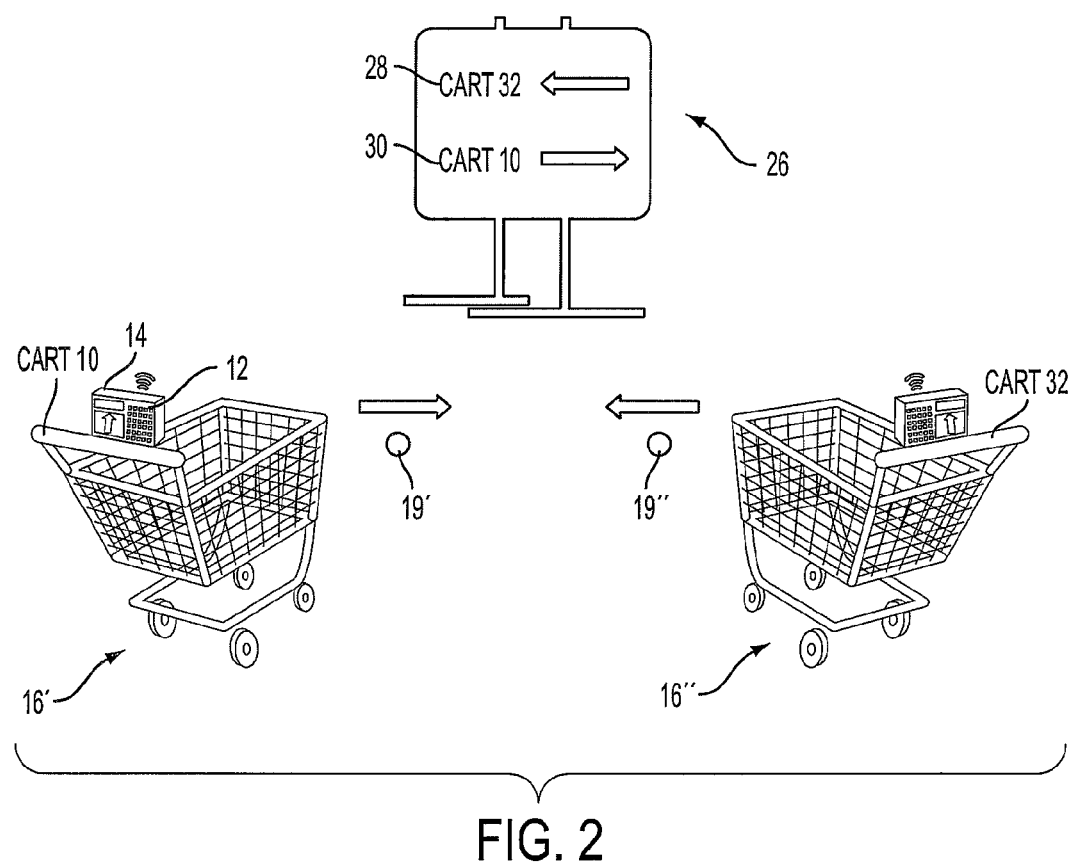
FIG. 2 generally illustrates an exemplary embodiment of a directional finding system with a stationary visual display.

FIG. 2 illustrates an exemplary embodiment of a directional finding system with a stationary visual display 26 positioned at select locations. Controller 14 in such embodiment, shown to be associated with cart 16' ("Cart 10") or cart 16" ("cart 32"), also permits input by the user as to desired location, as by, for example, touch components 12. Controller 14 likewise detects location tags 19', 19" positioned along the paths in the facility. In such embodiment, however, display of directional information is not on controller 14, but rather on stationary visual display 26 which is illustrated to be indicating a different navigational direction for cart 32 (28) than cart 10 (30).

Figure 3:
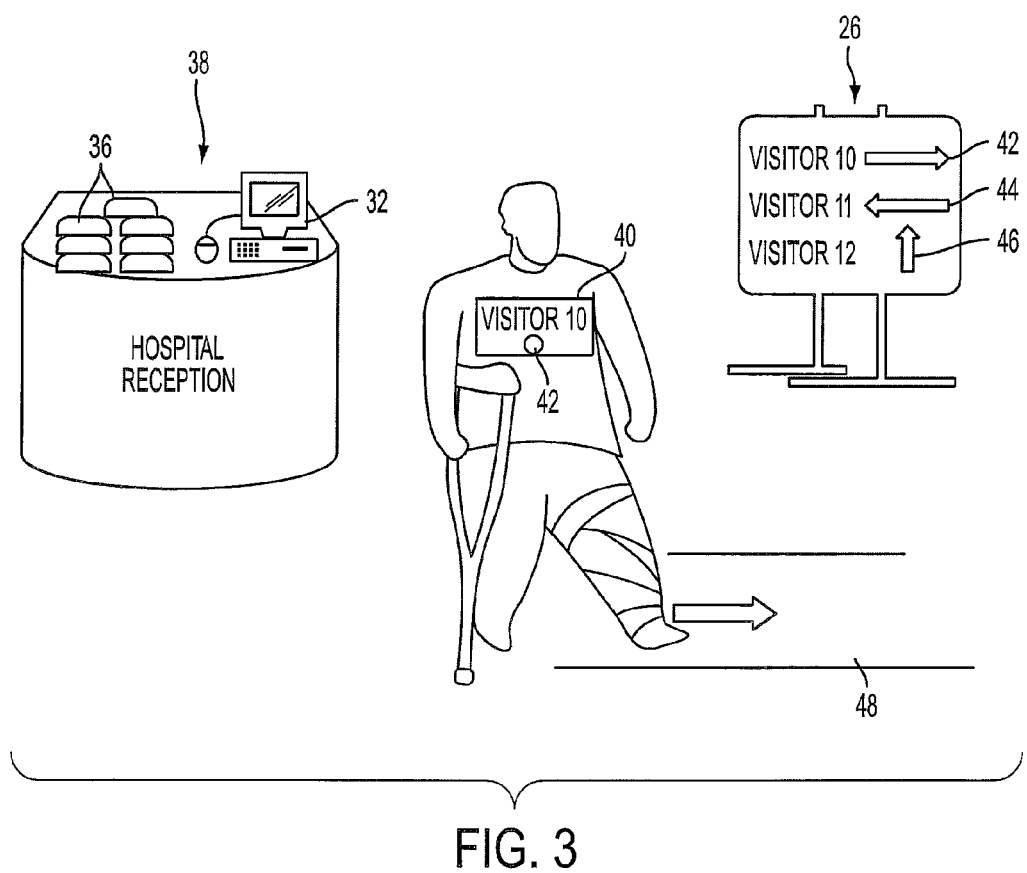
FIG. 3 shows an exemplary embodiment of a directional finding system wherein an electronically detectable item identifier is incorporated into a pass.

FIG. 3 shows an exemplary embodiment of a directional finding system wherein an electronically detectable item identifier is incorporated into a pass 40. Pass 40 is shown in FIG. 3 to include electronic tag 42. Pass 40 may be obtained from a reception facility 38 and may comprise one of many passes 36 which may be associated with more than one location, and/or may be associated with/or associable with (by way, for example, of input of information into the electronic tag 42 by way of a processing device 32) a unique identifier. Stationary sign 26 senses electronic tag 42 when electronic tag 42 is within range along path 48 of its sensing device, such as an interrogator. Alternate or multiple directional displays 42, 44, 46 may be determined by interrogating electronic tag 42 as to desired location, or by determining from processor 32 the desired location of the person carrying electronic tag 40 (in this case "Visitor 10") based on the unique identifier supported by tag 40.

Figure 4:
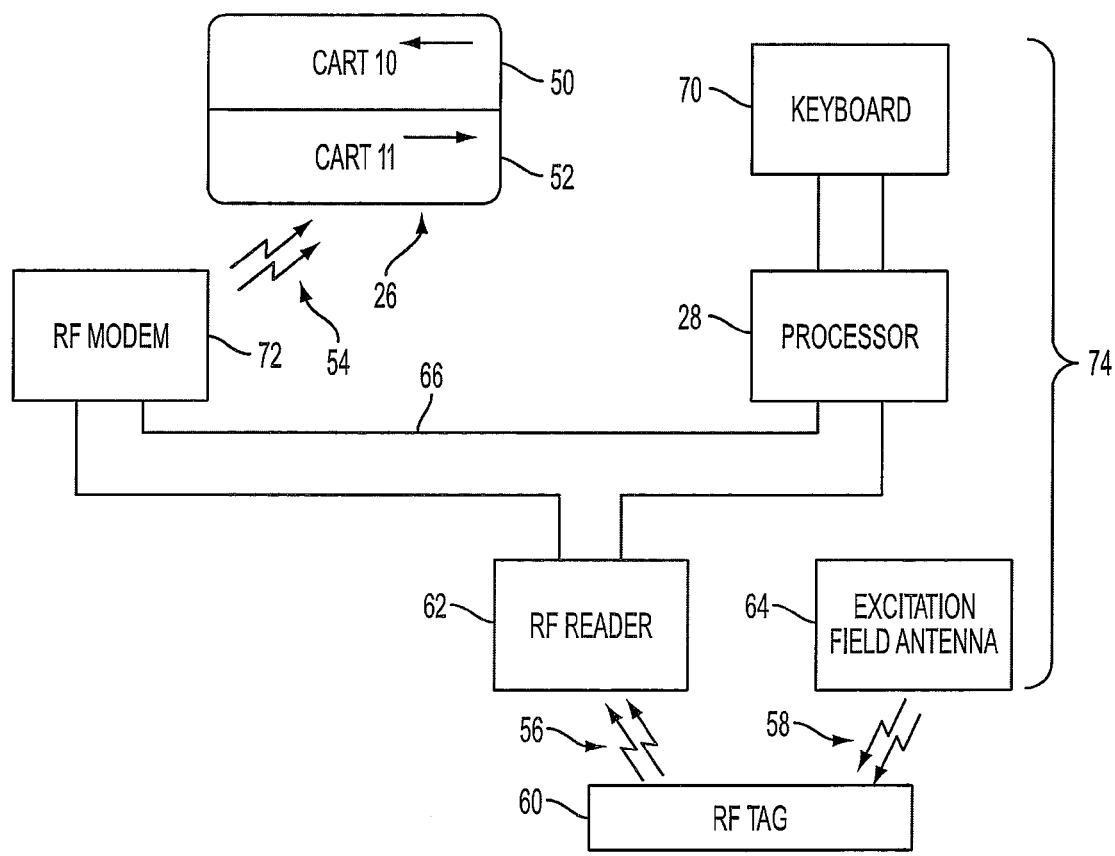
FIG. 4 is a block diagram of a system which provides navigating information based in part upon input from a RF tag.

FIG. 4 is a block diagram of a system which provides navigating information based in part upon input from a RF tag. Controller 74 comprises processor 28 which may be connected to an input device 70 receives through bus or data link 66 information pertaining to detection by radiofrequency reader 62 of radiofrequency signals 56 produced by RF tag 60 which is excitable by excitation signals 58 produced by excitation field antenna 64 having a known range. A communications transceiver, such as radio frequency modem 72, broadcast signals 54 to electronic signage 26 which computes from the information carried in broadcast signals 54 the appropriate directional navigation for a person moving cart 10 (50) or cart 11 (52) to which controller 74 is associated.

It will be appreciated that variations of the above-disclosed embodiments and other features and functions, or alternatives thereof, may be desirably combined into many other different devices or applications. Also that various presently unforeseen or unanticipated alternatives, modifications, variations or improvements therein may be subsequently made by those skill in the art which are also intended to be encompassed by the following claims.

What is claimed is:

1. A direction finding system comprising:
   at least one electronically-readable tag;
   a plurality of mobile controllers, each mobile controller comprising: a mobile visual directional display, an electronic input device, and an electronic interrogator operatively configured to detect the electronically-readable tag;

said direction finding system further comprising stationary electronic signage operatively coupled to the electronic interrogator, the electronic signage comprising a stationary display and being operatively configured to alter a directional indication upon said stationary display in response to changes of relative location of the tag in relation to the electronic interrogator, wherein the stationary display is configured to display multiple directional indications for at least two mobile controllers simultaneously.

2. The system of claim 1 wherein the electronically-readable tag is an RFID tag.

3. The system of claim 1 wherein the stationary display is an emissive or non-emissive display.

4. The system of claim 1 wherein the directional indication is at least in part graphical.

5. The system of claim 1 wherein the directional indication is at least in part in written language.

6. A visual directional electronic system comprising at least one object marker associated with an object, the object marker being operatively configured to store information indicative of an identity of the object;

a plurality of location markers each positioned at one of a plurality of locations and operatively configured to store information associable with the location of the location marker;

electronic signage comprising a display operatively configured to visually display directional information;

a plurality of a mobile interrogators, each mobile interrogator having comprising detection circuitry capable of detecting location markers;

a processor operatively connected to the interrogator and the electronic signage, the processor being operatively configured to receive input as to the identity of at least one object marker, and to receive input from the interrogator to determine a spatial relationship between at least one detected location marker and at least one object, and to cause change in directional information displayed on the display of the electronic signage based on such spatial relationship, wherein the display is configured to display multiple directional information for at least two mobile interrogators simultaneously.

7. The system of claim 6 wherein the object marker is an RFID tag.

8. The system of claim 6 wherein the electronic signage comprises an emissive or non-emissive display.

9. The system of claim 6 wherein the directional information display is at least in part graphical.

10. The system of claim 6 wherein the directional information displayed is at least in part in written language.

11. The system of claim 6 wherein at least one of the location markers is an RFID tag.

12. The system of claim 6 wherein the location markers are positioned along a path.

13. An electronic directional system capable of locating one or more items of a plurality of items stored in a facility, the system comprising an object marker associated with an object, the object marker being operatively configured to store information indicative of an identity of the object;

a plurality of location markers each positioned at one of a plurality of locations and operatively configured to store information associable with the location of the location marker;

electronic signage comprising a display operatively configured to display directional information;

a plurality of a mobile interrogators, each mobile interrogator comprising detection circuitry capable of detecting location markers;

an input operatively configured to obtain information pertaining to one or more items in the facility which are desired to be obtained from the facility;

a processor operatively connected to the interrogator, the electronic signage, and the input, the processor being operatively configured to receive information as to the identity of an object from the object marker, to determine a spatial relationship between at least one location marker and the object, and to cause change in directional information displayed on the display of the electronic signage based on such spatial relationship and the input information, wherein the display is configured to display multiple directional information for at least two mobile interrogators simultaneously.

14. The system of claim 13 wherein the object marker is an RFID tag.

15. The system of claim 13 wherein the electronic signage comprises an emissive or non-emissive display.

16. The system of claim 13 wherein the directional information display is at least in part graphical.

17. The system of claim 13 wherein the directional information displayed is at least in part in written language.

18. The system of claim 13 wherein at least one of the location markers is an RFID tag.

19. A system for navigating to a desired location comprising:

a plurality of mobile controllers, each mobile controller comprising an information processor and a communication transceiver;

a plurality of routing tags providing information associable with a location of said routing tags to the processor upon receipt of a transmission from the communication transceiver;

electronic signage comprising a display operatively configured to display directional information and operatively connected to the information processor;

wherein said information processor is operatively configured to use information pertaining to said routing tags responsive to a transmission from the communication transceiver and information pertaining to the desired location to determine the appropriate directional information to be displayed on the display of the electronic signage to permit navigation of the mobile controllers to the desired location, wherein the display is configured to display multiple directional information for at least two mobile controllers simultaneously.

20. The system of claim 19 wherein at least one of the routing tags is an RFID tag.

21. The system of claim 19 wherein the electronic signage comprises an emissive or non-emissive display.

22. The system of claim 1, wherein the multiple directional indications for the at least two mobile controllers are different.

23. The system of claim 6, wherein the multiple direction information for the at least two mobile interrogators are different.

24. The system of claim 13, wherein the multiple direction information for the at least two mobile interrogators are different.

25. The system of claim 19, wherein the multiple direction information for the at least two mobile controllers are different.

* * * * *